(12) United States Patent
Nishiguchi et al.

(10) Patent No.: US 10,132,702 B2
(45) Date of Patent: Nov. 20, 2018

(54) TORQUE DETECTING DEVICE

(71) Applicant: DENSO CORPORATION, Kariya, Aichi-pref. (JP)

(72) Inventors: Yoshitaka Nishiguchi, Nishio (JP); Ken Tanaka, Nishio (JP); Shigetoshi Fukaya, Kariya (JP); Toshiro Suzuki, Kariya (JP); Satoru Jinno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/875,501

(22) Filed: Jan. 19, 2018

(65) Prior Publication Data

US 2018/0209861 A1    Jul. 26, 2018

(30) Foreign Application Priority Data

Jan. 23, 2017   (JP) .................... 2017-009709

(51) Int. Cl.
| | |
|---|---|
| *G01L 3/10* | (2006.01) |
| *B62D 6/10* | (2006.01) |
| *B62D 5/04* | (2006.01) |
| *B62D 3/12* | (2006.01) |

(52) U.S. Cl.
CPC ............ *G01L 3/101* (2013.01); *B62D 5/0463* (2013.01); *B62D 6/10* (2013.01); *B62D 3/12* (2013.01)

(58) Field of Classification Search
CPC ........ G01L 3/101; G01D 3/028; G01D 15/12; B62D 6/10

USPC ...................... 73/862.331–862.338
See application file for complete search history.

(56) References Cited

U.S. PATENT DOCUMENTS

| | | | | |
|---|---|---|---|---|
| 7,021,160 | B2 * | 4/2006 | Pattok ..................... | G01L 3/101 |
| | | | | 73/862.332 |
| 8,776,619 | B2 * | 7/2014 | Jammer ................. | G01L 3/104 |
| | | | | 73/862.333 |
| 8,836,267 | B2 * | 9/2014 | Aoki ....................... | B62D 6/10 |
| | | | | 318/136 |
| 2013/0113410 | A1 | 5/2013 | Aoki | |

FOREIGN PATENT DOCUMENTS

JP       2011-089890       5/2011

* cited by examiner

*Primary Examiner* — Jonathan Dunlap
*Assistant Examiner* — Octavia Hollington
(74) *Attorney, Agent, or Firm* — Knobbe, Martens, Olson & Bear, LLP

(57) ABSTRACT

Claw portions opposing a magnet are disposed on inner edges of a first yoke and a second yoke. Wall portions are disposed on outer edges of the first yoke and the second yoke so as to extend in an axial direction. A distal end of the wall portion and another distal end of the other wall portion are spaced apart from each other in the axial direction and disposed to oppose each other. A magnetic sensor is disposed between the distal ends in the axial direction. End faces oblique to the axial direction are disposed on the distal ends and a distance between the distal ends on a radially inner side is made shorter than a distance between the distal ends on a radially outer side.

5 Claims, 6 Drawing Sheets

TORQUE DETECTING DEVICE

CROSS-REFERENCE TO RELATED APPLICATION

This application is based on and claims the benefit of priority from earlier Japanese Patent Application No. 2017-009709 filed Jan. 23, 2017, the description of which is incorporated herein by reference.

TECHNICAL FIELD

The present disclosure relates to a torque detecting device for detecting torsional torque.

BACKGROUND

Conventionally, it is known that a torque detecting device (torque sensor) for detecting torsional torque (shaft torque) has been used in an electric power steering device or the like.

In a torque sensor disclosed in Japanese Patent Application Laid-Open Publication No. 2013-101038, for example, when a torsion bar connecting an input shaft and an output shaft is twisted, a pair of yokes are relatively displaced in a circumferential direction with respect to a multipolar magnet.

At this time, a magnetic sensor detects a magnetic flux density between the yokes, and a torsional torque is detected based on the change in the magnetic flux density.

Magnetic force lines have the property of passing through places with high magnetic permeability along a shape of a magnetic body and also have the property of continuing in a straight line in the magnetic body.

Therefore, the magnetic force lines pass along the shape of the magnetic body when the magnetic body is bent, however, the magnetic flux density is different between an inside and an outside of the magnetic body due to its rectilinearity.

More specifically, when the magnetic force lines pass through a bent magnetic body, the magnetic force lines are likely to gather outside on the outside than on the inside of the magnetic body due to its rectilinearity.

Thus, when disposing the magnetic sensor at a bent portion and detecting the magnetic flux density at the bent portion, the magnetic flux density tends to be higher at the outside of the magnetic body.

Therefore, when disposing the magnetic sensor at the bent portion, there is a problem that the magnetic flux density detected by the magnetic sensor is different when the position of the magnetic sensor deviates outside or inside relative to the magnetic body.

For this reason, in order to improve a detection accuracy of the magnetic flux density, it is necessary to assemble the torque detecting device so that the magnetic sensor is disposed accurately at the same position.

SUMMARY

An embodiment provides a torque detecting device facilitating an arrangement of a magnetic sensor.

In a torque detecting device according to a first aspect, the torque detecting device for detecting a torsional torque between a first shaft and a second shaft based on a torsional displacement of an elastic member that coaxially connects the first shaft and the second shaft, the torque detecting device includes a magnet fixed to the first shaft, a pair of magnetic yokes fixed in a state of being spaced apart from each other in an axial direction, and a magnetic sensor that detects a magnetic flux density between the pair of magnetic yokes.

The pair of magnetic yokes include opposing portions disposed opposed to the magnet and displace in a circumferential direction with respect to the magnet when the elastic member is torsionally displaced, and wall portions disposed radially outside the opposing portions, the wall portions being disposed so as to extend from one magnetic yoke side to another magnetic yoke side and are disposed opposing each other with the magnetic sensor interposed therebetween.

Distal ends of the wall portions of the pair of magnetic yokes are opposing each other and the magnetic sensor is disposed between the distal ends, and a distance between the distal ends on a radially inner side is shorter than a distance between the distal ends on the radially outer side.

Magnetic force lines have a property of passing through places of high magnetic permeability along a shape of a magnetic yoke and also have a property of continuing in a straight line in the magnetic yoke.

Therefore, in a case of a wall portion positioned radially outside opposing portions and extending in the axial direction toward another magnetic yoke side, the magnetic flux density tends to become smaller at a radially inner side than at a radially outside the magnetic yoke.

That is, since the magnetic force lines tend to continue in a straight line forward from the opposing portion and are more likely to gather on an outer side of the wall portions in the radial direction, the magnetic flux density tends to be smaller on the inner side than on the outer side when detecting the magnetic flux density between distal ends of the wall portions disposed so as to extend toward the other magnetic yoke side.

Therefore, the distance between the distal ends on the radially inner side is made shorter than the distance between the distal ends on the radially outer side so that the detected magnetic flux density is averaged.

That is, the magnetic flux density tends to increase as the distance between the distal ends decreases, whereas the magnetic flux density tends to become smaller as the distance increases, so that the detected magnetic flux density is averaged.

As a result, even if a positional deviation of the magnetic sensor occurs in the radial direction, the detected magnetic flux density becomes the same.

Therefore, even if positional deviation of the magnetic sensor occurs in the radial direction, the magnetic flux density can be detected in the same manner, thus the arrangement of the magnetic sensor becomes easy.

DETAILED DESCRIPTION OF THE PREFERRED EMBODIMENTS

Figure 1:
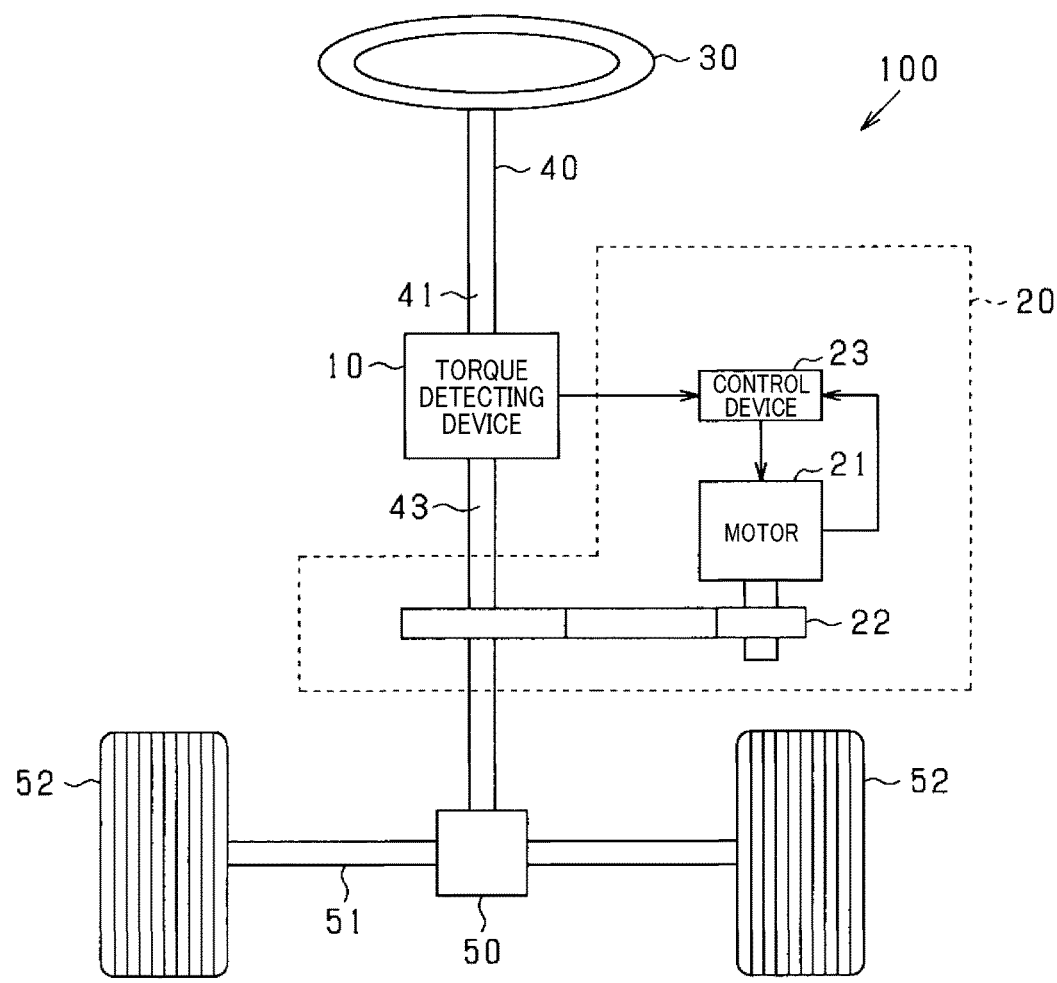
FIG. 1 shows a schematic configuration diagram of a steering system.

Embodiments of the present disclosure will be described hereinafter with reference to the drawings.

It should be noted that in the following embodiments, components identical with or similar to each other are given the same reference numerals, unless otherwise indicated, and repeated structures and features thereof will not be described in order to avoid redundant explanation.

A torque detecting device 10 according to an embodiment will be described with reference to the drawings.

As shown in FIG. 1, the torque detecting device 10 is used, for example, in a steering system 100 provided with an electric power steering device 20 for assisting a steering operation of a vehicle.

A steering wheel 30 is connected to a steering shaft 40.

Figure 2:
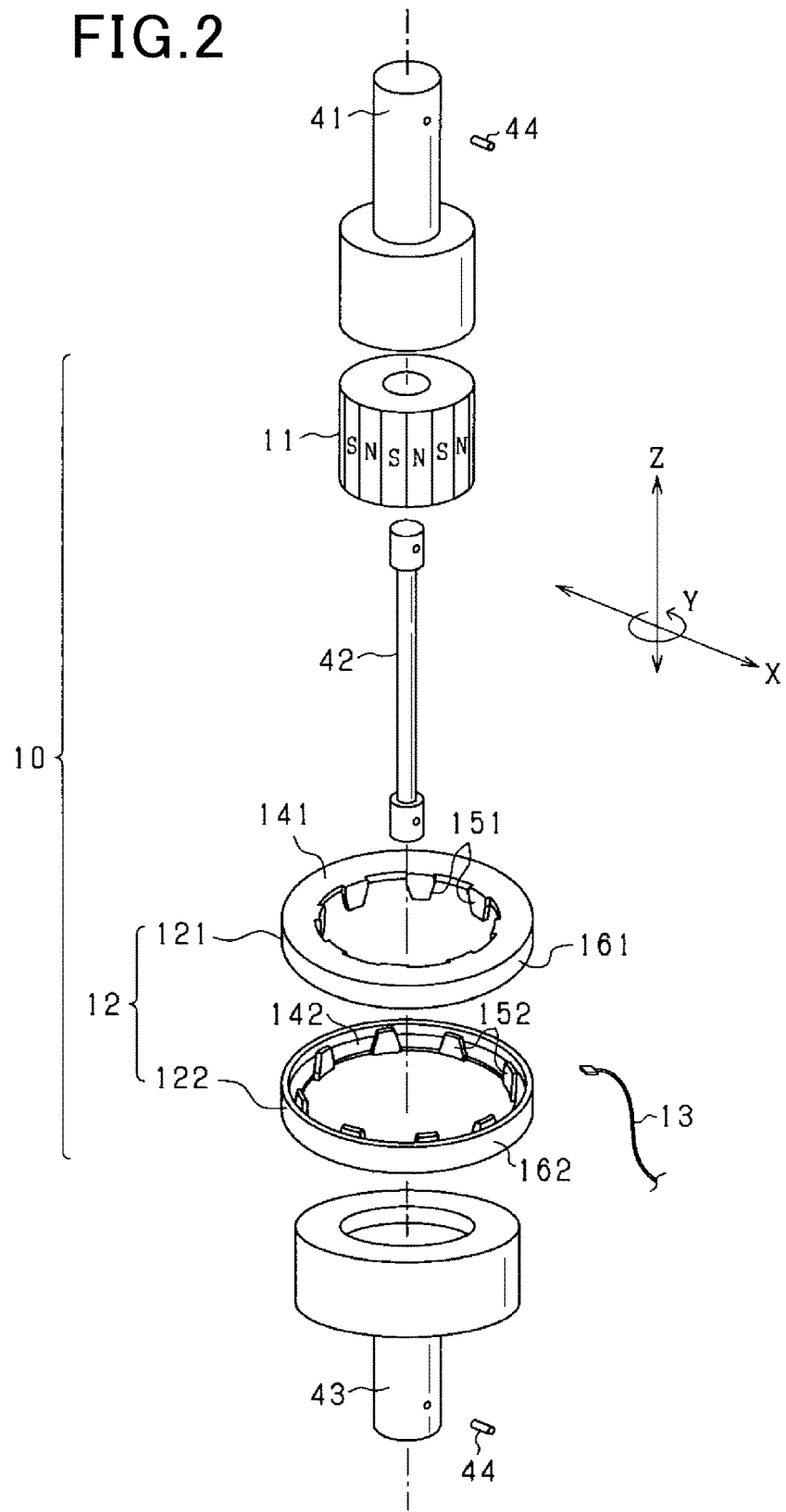
FIG. 2 shows an exploded perspective view of a torque detecting device.

As shown in FIG. 2, the steering shaft 40 includes an input shaft 41 as a first shaft connected to the steering wheel 30, a torsion bar 42 connected to the input shaft 41, and an output shaft 43 as a second shaft connected to the input shaft 41 via the torsion bar 42.

One end side of the torsion bar 42 is fixed to the input shaft 41 and another end side thereof is fixed to the output shaft 43 by fixing pins 44, respectively and the torsion bar 42 connects the input shaft 41 and the output shaft 43 coaxially.

The torsion bar 42 is a rod-shaped elastic member, and is torsionally displaced according to a torsional torque applied to the steering shaft 40 to store an elastic force.

As shown in FIG. 1, a torque detecting device 10 for detecting the torsional torque applied to the torsion bar 42 (that is, the steering shaft 40) is disposed between the input shaft 41 and the output shaft 43.

A pinion gear 50 is disposed at a distal end of the output shaft 43, and the pinion gear 50 is engaged with a rack shaft 51.

A pair of wheels 52 are connected to both ends of the rack shaft 51 via tie rods or the like (not shown).

Accordingly, when a driver rotates (steers) the steering wheel 30, the steering shaft 40 connected to the steering wheel 30 rotates.

When the steering shaft 40 rotates, the rack shaft 51 linearly moves in a lateral direction by the pinion gear 50.

Then, the pair of wheels 52 are steered according to a displacement amount of the rack shaft 51.

The electric power steering device 20 includes a motor that outputs assist torque for assisting steering of the steering wheel 30 by the driver, a speed reduction gear 22, a control device 23, and the like.

The speed reduction gear 22 reduces a rotation of the motor 21 and transmits it to the steering shaft 40.

In the present embodiment, although the electric power steering device 20 is a column-assist type, it may be a pinion-assist type transferring the rotation of the motor 21 to the pinion gear 50 or may be a rack-assist type transferring the rotation of the motor 21 to the rack shaft 51.

The control device 23 receives a voltage signal indicating the torsional torque from the torque detecting device 10, and controls the driving of the motor 21 according to the acquired voltage signal.

In the following description, when simply referred to as an axial direction, it means an axial direction of the steering shaft 40 (including the input shaft 41, the torsion bar 42, and the output shaft 43, the same applies hereinafter).

In addition, when simply referred to as a radial direction, it means a radial direction of the steering shaft 40, and when simply referred to as a circumferential direction, it means a circumferential direction of the steering shaft 40.

Further, in the drawings, the axial direction of the steering shaft 40 is indicated by an arrow Z, the radial direction is indicated by an arrow X, and the circumferential direction is indicated by an arrow Y.

As shown in FIG. 2, the torque detecting device 10 includes a magnet 11 fixed to the input shaft 41, a pair of magnetic yokes 12 fixed to the output shaft 43, a magnetic sensor 13 that detects a magnetic flux density between the pair of magnetic yokes 12, and the like.

The magnet 11 is formed in a cylindrical shape with a hard magnetic body. The magnet 11 is fixed coaxially to the input shaft 41.

N poles and S poles in the magnet 11 are alternately magnetized in the circumferential direction. In the present embodiment, the number of N poles and S poles is 8 pairs, totaling 16 poles. The number of magnetic poles of the magnet 11 is not limited to 16 poles but may be an even number.

The pair of magnetic yokes 12 are disposed in a state of being spaced apart from each other in the axial direction.

Note that a space arrangement between the magnetic yokes 12 is fixed by resin-molding the pair of magnetic yokes 12, or by a spacer or the like disposed therebetween.

Here, one of the magnetic yokes 12 disposed on the input shaft 41 side is denoted as a first yoke 121, and another one of the magnetic yokes 12 disposed on the output shaft side is denoted as a second yoke 122.

Both of the first yoke 121 and the second yoke 122 are annularly formed of a soft magnetic body, and are fixed to the output shaft 43 on a radially outside the magnet 11.

Specifically, the first yoke 121 includes an annular ring portion 141, claw portion 151 as opposing portions disposed so as to extend along the axial direction, and a wall portion 161 disposed radially outside the claw portions 151.

Similarly, the second yoke 122 also includes an annular ring portion 142, claw portion 152 as opposing portions disposed so as to extend along the axial direction, and a wall portion 162 disposed radially outside the claw portions 152.

First, the ring portions 141, 142 will be described.

Figure 3A:
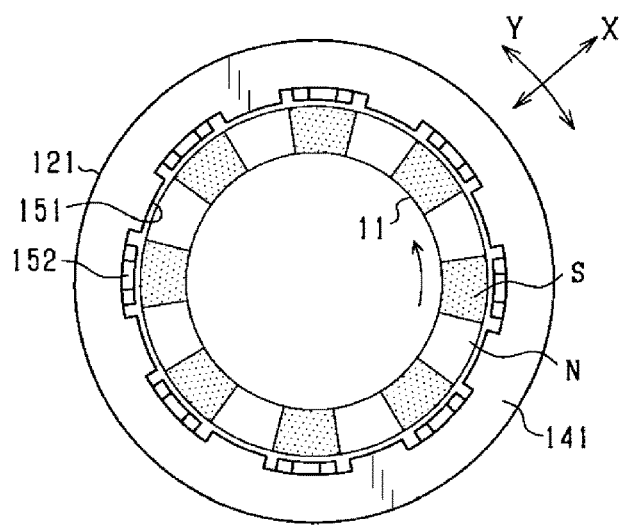
FIGS. 3A, 3B, and 3C show plan views of the torque detecting device.
Figure 3B:
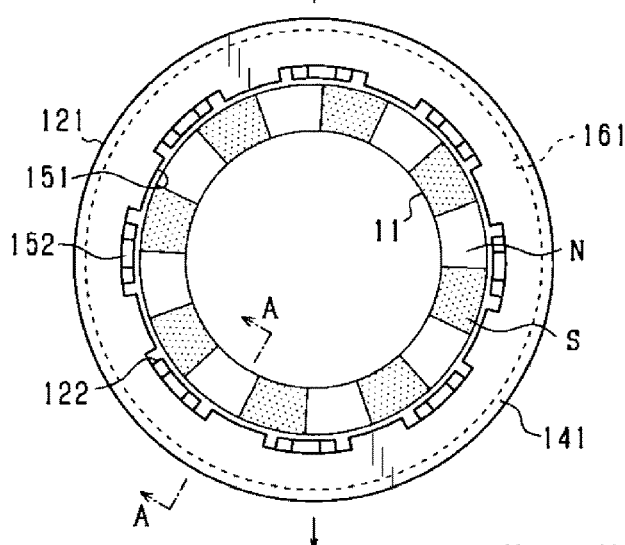
Figure 3C:
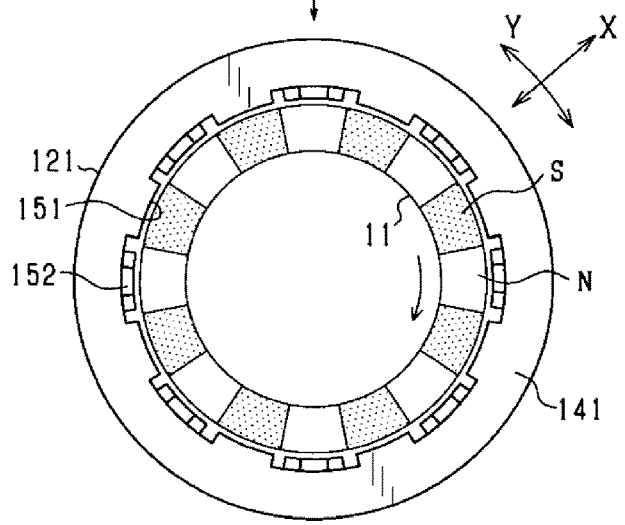

As shown in FIGS. 3A, 3B, and 3C, an inner diameter of each ring portions 141, 142 is larger than an outer diameter of the magnet 11. Therefore, the ring portions 141, 142 are spaced apart from the magnet 11 and are not in contact with each other.

Figure 4:
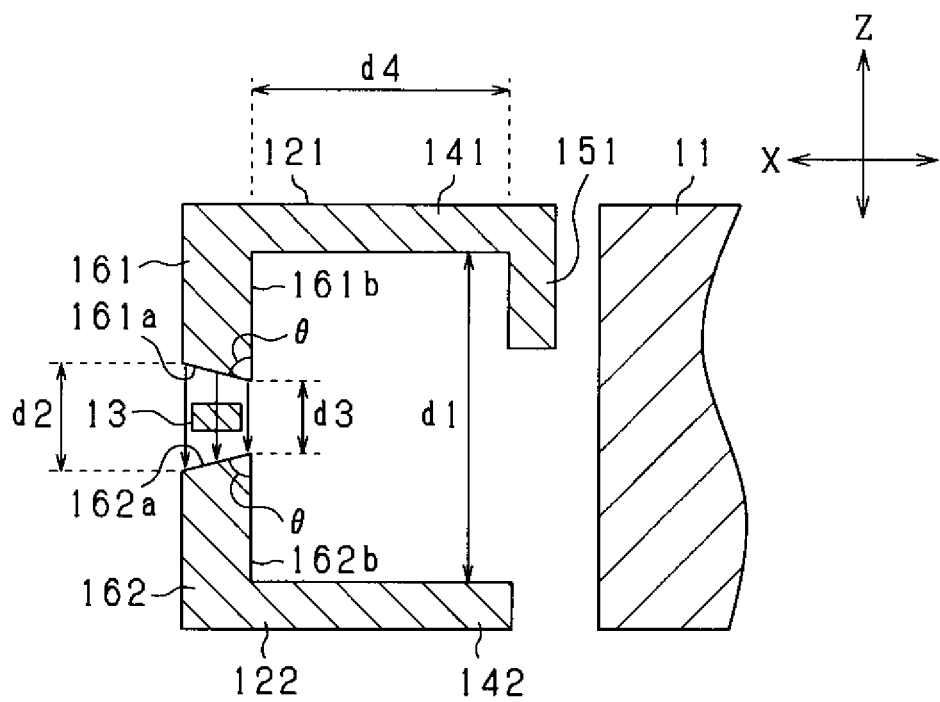
FIG. 4 shows a cross sectional view of the torque detecting device taken along a line A-A in FIG. 3B.

FIG. 4 is a cross sectional view of the torque detecting device taken along a line A-A in FIG. 3B.

As shown in FIG. 4, an outer diameter of the ring portion 141 of the first yoke 121 is the same as an outer diameter of the ring portion 142 of the second yoke 122.

Further, the inner diameter of the ring portion 141 of the first yoke 121 is the same as the inner diameter of the ring portion 142 of the second yoke 122.

As shown in FIG. 4, the ring portions 141, 142 are formed in a thin plate shape and are disposed so as to extend in a direction orthogonal to the axial direction.

In addition, the ring portion 141 of the first yoke 121 is aligned with an end portion of the magnet 11 on the input shaft 41 side in the axial direction.

On the other hand, the ring portion 142 of the second yoke 122 is aligned with another end portion of the magnet 11 on the output shaft 43 side in the axial direction.

Therefore, the distance d1 from the ring portion 141 of the first yoke 121 to the ring portion 142 of the second yoke 122 in the axial direction is substantially the same as the height of the magnet 11.

It should be noted that as long as the claw portions 151, 152 and the magnet 11 are opposed to each other, the distance d1 between the ring portions 141, 142 may be longer or shorter than the height of the magnet 11.

Next, the claw portions 151, 152 will be described.

As shown in FIG. 3, the claw portions 151, 152 are disposed in the same number (8 in the present embodiment) as the number of pole pairs of the magnet 11.

The claw portions 151, 152 are disposed at equal intervals along inner edges of the ring portions 141, 142. That is, a plurality of claw portions 151, 152 are disposed according to a magnetic pole pitch of the magnet 11.

The claw portions 151 of the first yoke 121 and the claw portion 152 of the second yoke 122 are alternately disposed while being shifted in the circumferential direction. Note that the number of the claw portions 151, 152 may be different from the number of pole pairs of the magnet 11.

The claw portions 151, 152 are disposed to oppose an outer periphery of the magnet 11. As shown in FIG. 3B, when no torsional displacement occurs in the torsion bar 42, that is, when no torsional torque is applied to the steering shaft 40, a center of each claw 151, 152 and a boundary of the N pole and S of the magnet 11 coincide with each other.

It should be noted that the magnet 11 and the magnetic yoke 12 are not in contact with each other.

As shown in FIG. 2 and FIG. 4, the claw portions 151 of the first yoke 121 are disposed so as to extend from the first yoke 121 toward the second yoke 122 side in the axial direction.

Similarly, the claw portions 152 of the second yoke 122 are disposed so as to extend from the second yoke 122 toward the first yoke 121 side in the axial direction.

The claw portions 151, 152 are erected so as to be orthogonal to the ring portions 141, 142, and widths in the circumferential direction of the distal end sides thereof are formed to be narrower than the root portions.

Further, the claw portions 151, 152 are disposed at distances from the outer periphery of the magnet 11.

As shown in FIG. 3, the claw portions 151 of the first yoke 121 are disposed at an interval of 45 degrees in the circumferential direction along an inner edge of the ring portion 141. The same applies to the claw portion 152 of the second yoke 122.

The first yoke 121 is positioned with respect to the second yoke 122 such that the claw portions 151, 152 are disposed alternately at 22.5 degrees intervals.

In the circumferential direction, there is a gap between the claw portions 151, 152 so as not to come into contact with the adjacent claw portions 151, 152. In addition, the claw portions 151, 152 are spaced apart from each other so as not to contact the other magnetic yoke 12.

Next, the wall portions 161, 162 will be described.

As shown in FIG. 4, a distal end 161a of the wall portion 161 of the first yoke 121 and a distal end 162a of the wall portion 162 of the second yoke 122 are spaced apart in the axial direction.

Then, the distal end 161a of the wall portion 161 of the first yoke 121 and the distal end 162a of the wall portion 162 of the second yoke 122 are disposed to oppose each other in the axial direction.

Specifically, the wall portion 161 of the first yoke 121 is formed so as to extend from an outer edge of the ring portion 141 of the first yoke 121 toward the second yoke 122 side in the axial direction.

The wall portion 161 of the first yoke 121 is disposed so as to be orthogonal to the ring portion 141. Further, as shown by a broken line in FIG. 3B, the wall portion 161 of the first yoke 121 is disposed over the entire circumference of the ring portion 141.

The wall portion 162 of the second yoke 122 is configured similarly. That is, as shown in FIG. 4, the wall portion 162 of the second yoke 122 is formed so as to extend from the outer edge of the ring portion 142 of the second yoke 122 toward the first yoke 121 side in the axial direction.

However, the wall portion 162 of the second yoke 122 is disposed so that the distal end thereof 162a does not contact the first yoke 121.

The wall portion 162 of the second yoke 122 is disposed so as to be orthogonal to the ring portion 142. The wall portion 162 of the second yoke 122 is disposed over the entire circumference of the ring portion 142.

The length of the wall portion 161 of the first yoke 121 in the axial direction and the length of the wall portion 162 of the second yoke 122 in the axial direction are formed to be the same length.

In the present embodiment, the wall portions 161, 162 are formed to be shorter than half the distance d1 between the ring portions 141, 142.

In addition, the outer diameters of the ring portions 141, 142 are formed to be the same, and the ring portions 141, 142 are fixed coaxially.

For this reason, the distal ends 161a, 162a of the wall portions 161, 162 are disposed to oppose each other.

In the axial direction, distances d2, d3 (a distance d2 on the radially outer side and a distance d3 on the radially inner side) between the wall portion 161 of the first yoke 121 and the wall portion 162 of the second yoke 122 are shorter than any distance between the magnetic yokes 12.

For example, the distances d2 and d3 are shorter in the radial direction than distances d4 from the wall portions 161, 162 to the claw portions 151, 152.

In addition, the distances d2 and d3 are shorter than the distance between the adjacent claw portions 151, 152 in the circumferential direction.

Therefore, the magnetic flux density increases between the distal end 161a of the wall portion 161 of the first yoke 121 and the distal end 162a of the wall portion 162 of the second yoke 122 when the relative position with respect to the magnet 11 in the circumferential direction is displaced relative to the magnet 11.

That is, the magnetic flux can be suppressed from leaking from portions other than the wall portions 161, 162 of the magnetic yoke 12.

At least one magnetic sensor 13 is disposed between the wall portion 161 of the first yoke 121 and the wall portion 162 of the second yoke 122.

The magnetic sensor 13 outputs a voltage signal having a voltage corresponding to the detected magnetic flux density. A Hall element, a magnetoresistance element or the like is used as the magnetic sensor 13, for example.

The magnetic sensor 13 is disposed between the distal end 161a of the wall portion 161 of the first yoke 121 and the distal end 162a of the wall portion 162 of the second yoke 122 in the axial direction.

That is, the wall portion 161 of the first yoke 121 and the wall portion 162 of the second yoke 122 are opposed to each other with the magnetic sensor 13 interposed therebetween.

The magnetic sensor 13 in the present embodiment is disposed at a center between the ring portions 141, 142 in the axial direction. The magnetic sensor 13 is disposed so as to detect the magnetic flux density in the axial direction.

That is, the magnetic sensor 13 detects the magnetic flux density in the axial direction between the distal end 161a of the wall portion 161 of the first yoke 121 and the distal end 162a of the wall portion 162 of the second yoke 122.

Here, detection of torsional torque by the magnetic sensor 13 will be described.

First, a case where no torsional torque is applied between the input shaft 41 and the output shaft 43, that is, a case where the torsion bar 42 is not twisted so that the torsion bar 42 is in a neutral position will be described.

In this case, as shown in FIG. 3B, the centers of the claw portions 151, 152 are disposed so as to coincide with the boundaries between the N poles and the S poles of the magnet 11, respectively.

At this time, the same number of magnetic force lines enters and leaves the claw portions 151, 152 from the N poles and S poles of the magnet 11.

For this reason, the magnetic force lines are closed inside the first yoke 121 and the second yoke 122, respectively.

Therefore, the magnetic flux does not leak between the first yoke 121 and the second yoke 122, and the magnetic flux density detected by the magnetic sensor 13 becomes zero.

When a torsional torque is applied between the input shaft 41 and the output shaft 43 and a torsional displacement occurs in the torsion bar 42, the relative position between the magnet 11 and the pair of magnetic yokes 12 is displaced in the circumferential direction.

As a result, as shown in FIGS. 3A and 3C, the centers of the claw portions 151, 152 disposed in the magnetic yoke 12 and the boundaries between the N poles and the S poles of the magnet 11 do not coincide with each other, so that the magnetic force lines having polarities of N poles or S poles increase in the magnetic yoke 12.

In this case, since magnetic force lines having opposite polarities increase in the first yoke 121 and the second yoke 122, the magnetic flux density increases between the first yoke 121 and the second yoke 122.

More specifically, the magnetic flux density increases according to the displacement between the wall portion 161 of the first yoke 121 and the wall portion 162 of the second yoke 122 when the relative position with respect to the magnetic yoke 12 relative to the magnet 11 is displaced in the circumferential direction.

The magnetic flux density detected by the magnetic sensor 13 is substantially proportional to an amount of torsional displacement of the torsion bar 42 and its polarity is reversed according to a torsion direction of the torsion bar 42.

The magnetic sensor 13 detects this magnetic flux density and outputs it as a voltage signal. The voltage of the voltage signal is substantially proportional to the magnetic flux density, that is, the amount of torsional displacement.

Then, since the torsional torque is proportional to the amount of torsional displacement, the voltage of the voltage signal is also proportional to the torsional torque. Therefore, the torque detecting device 10 can output a voltage signal corresponding to the torsional torque.

Meanwhile, the magnetic force lines have a property of passing through a route having the maximum magnetic permeability along the shape of the first yoke 121 (or the second yoke 122), and also have a property of continuing in a straight line as much as possible without crossing mutually inside the first yoke 121 (or the second yoke 122).

Therefore, in a case of the wall portions 161, 162 being positioned radially outside the claw portions 151, 152 and are disposed so as to extend in the axial direction to the other magnetic yoke side, the magnetic flux density tends to be smaller in the radially inner side than in the outer side of the wall portions 161, 162.

Figure 5:
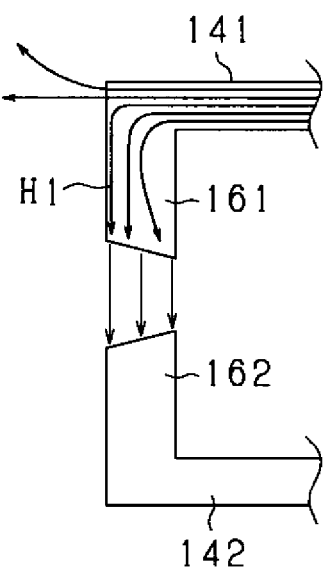
FIG. 5 shows a schematic diagram showing magnetic force lines.

That is, as shown in FIG. 5, the magnetic force lines H1 from the claw portion 151 of the first yoke 121 continues in a straight line through the ring portion 141 so as to be directed from the radially inner side to the outer side.

Since the wall portion 161 which is a magnetic body is erected so as to be orthogonal to the ring portion 141 on an end portion (outer edge) of the ring portion 141, the magnetic force lines H1 which have proceeded straight are bent along the shape of the first yoke 121 so as to minimize the magnetic resistance (so as the magnetic permeability becomes the maximum). That is, the magnetic force lines H1 bend along the wall portion 161.

However, since the magnetic force lines H1 have rectilinearity, they curve so as to bulge outwardly in the radial direction, and become easy to gather outside in the radial direction in the wall portion 161. That is, the magnetic force lines H1 bend along the wall portion 161 on the outer side in the radial direction in many cases.

It should be noted that some of the magnetic force lines H1 may continue in a straight line and leak to the outside of the magnetic yoke 12 in some cases.

Further, although there are also magnetic force lines H1 that pass through the radially inner side, the number decreases (magnetic flux density decreases) as compared with the radial outer side.

Therefore, when detecting the magnetic flux density between the distal ends 161a, 162a, the magnetic flux density tends to be smaller on the inner side than on the radially outer side.

Then, the distance d3 between the distal ends 161a, 162a on the radially inner side is made shorter than the distance d2 on the radially outer side so that the detected magnetic flux density is averaged.

This will be described in detail below.

As shown in FIG. 4, the distal ends 161a, 162a of the wall portions 161, 162 are provided with end faces, respectively, and the end face at one distal end 161a is inclined with respect to the end face at the other distal end 162a.

In the present embodiment, the end faces oblique to inner wall surfaces 161b, 162b of the wall portions 161, 162 are provided. That is, the end faces oblique to the axial direction are provided at the distal ends 161a, 162a of the wall portions 161, 162.

The end faces are disposed so that an angle (θ) with respect to the inner wall surfaces 161b, 162b of the wall portions 161, 162 in the radial direction is an acute angle.

In other words, the end faces of the distal ends 161a, 162a are provided such that the radially inner sides of the end faces are disposed closer to the other magnetic yoke side than the radially outer side.

In other words, the end face of the distal end 161a is disposed so that the radially inner side thereof is closer to the second yoke 122 than the radially outer side (so that the distance to the second yoke 122 becomes shorter).

Similarly, the end face of the distal end 162a is disposed so that the radially inner side thereof is closer to the first yoke 121 than the radially outer side (so that the distance to the first yoke 121 becomes shorter).

Thereby, the distance d3 between the distal ends 161a, 162a on the radially inner side is made shorter than the distance d2 on the radially outer side.

The magnetic resistance decreases and the detected magnetic flux density tends to increase as the distance between the distal ends 161a, 162a decreases, whereas the magnetic resistance increases and the magnetic flux density tends to decrease as the distance increases.

That is, the leakage of the magnetic flux decreases and the detected magnetic flux density tends to become large as the distance between the distal ends 161a, 162a decreases, whereas the leakage of the magnetic flux increases and the magnetic flux density tends to become small as the distance increases.

Therefore, in a situation where the magnetic force lines H1 are more likely to gather outside the wall portions 161, 162 rather than on the inside in the radial direction, when the distance d2 between the distal ends 161a, 162a on the radially outer side is made larger than the distance d3 on the radially inner side, the magnetic flux density detected between the distal ends 161a, 162a is averaged.

As a result, even if positional deviation of the magnetic sensor 13 occurs in the radial direction, the detected magnetic flux density is the same.

With the above configuration, the following effects are obtained.

The distance d3 between the distal ends 161a, 162a on the radially inner side thereof is made shorter than the distance d2 on the radially outer side, and the magnetic flux density detected is averaged by the magnetic sensor 13 disposed between the distal ends 161a, 162a.

That is, the magnetic resistance decreases and the detected magnetic flux density tends to increase as the distance between the distal ends 161a, 162a decreases, whereas the detected magnetic flux density tends to decrease as the distance increases.

Therefore, even when the magnetic force lines H1 are more likely to gather on outer side of the wall portions 161, 162 than on the inner side in the radial direction, the magnetic flux density detected by the magnetic sensor 13 is averaged.

As a result, even if positional deviation of the magnetic sensor 13 occurs in the radial direction, the detected magnetic flux density becomes the same.

Therefore, even if positional deviation of the magnetic sensor 13 occurs in the radial direction, the magnetic flux density can be detected in the same manner, thus the arrangement of the magnetic sensor 13 becomes easy.

Further, since the magnetic flux density can be detected in the same way, the detection accuracy is improved, and as a result, the detection accuracy of the torsional torque can be improved.

In addition, since it is not necessary to provide a member such as a magnetism collector ring for averaging the magnetic flux density, the number of parts can be reduced.

The distal ends 161a, 162a of the wall portions 161, 162 have the end faces, respectively, and the end face at one distal end 161a is inclined with respect to the end face at the other distal end 162a.

Therefore, compared with a case where steps are formed at the distal ends 161a, 162a to shorten the distance on the inner side in the radial direction in a stepwise manner, it is possible to further shorten the distance and to easily average the magnetic flux density.

Further, these end faces can be formed by cutting the distal ends 161a, 162a in an oblique direction with respect to the wall surfaces 161b, 162b of the wall portions 161, 162.

Therefore, it is easy to make the distance d3 between the distal ends 161a, 162a on the radially inner side shorter than the distance d2 on the radially outer side.

Further, the wall portions 161, 162 can be disposed along the axial direction by forming the end faces oblique to the wall surfaces 161b, 162b and can be downsized as compared with a case where the wall portions 161, 162 are disposed so as to spread outward in the radial direction.

The wall portions 161, 162 are disposed on the end portion (outer edge) on the radially outside the ring portions 141, 142. The magnetic force lines H1 have the property of gathering at a distal end.

Therefore, the magnetic force lines H1 passing through the ring portions 141, 142 can be collected at the distal ends 161a, 162a of the wall portions 161, 162. This makes it easier for the magnetic sensor 13 to detect the magnetic flux density.

Other Embodiments

The present disclosure is not limited to the above embodiment, and may be implemented as follows, for example.

Although the end faces oblique to the axial direction are respectively disposed at the distal ends 161a, 162a on both sides in each of the wall portions 161, 162, either one of them may be used.

Figure 6:
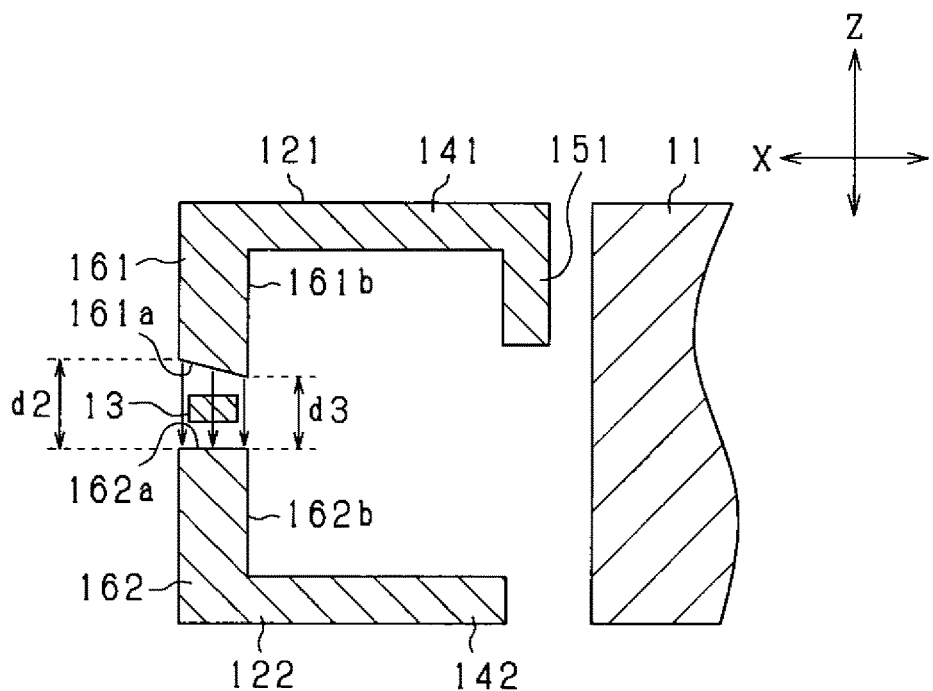
FIG. 6 shows a cross sectional view of a torque detecting device according to another embodiment.

As shown in FIG. 6, for example, an end face that is oblique to the axial direction is disposed at a distal end 161a, and another end face orthogonal to the axial direction may be disposed at another distal end 162a.

In this case as well, the distance d2 on the radially outer side can be made longer than the distance d3 on the radially inner side.

Although the end faces which are the same plane on a plane are disposed at the distal ends 161a, 162a of the wall portions 161, 162, configurations of the distal ends 161a, 162a may be changed as long as the distance d2 on the radially outer side is longer than the distance d3 on the radially inner side.

For example, the distance may be stepwisely increased by providing level differences.

Further, the configurations of the distal ends 161a, 162 may be, for example, curved surfaces.

Although the wall portions 161, 162 are disposed so as to be orthogonal to the ring portions 141, 142, the wall portions 161, 162 may not be orthogonal to the ring portions 141, 142.

More specifically, at least one of the wall portions 161, 162 disposed on the pair of magnetic yokes 12 may be formed obliquely to the axial direction so that the distal end thereof is positioned radially outside a base end of the wall portion.

Figure 7:
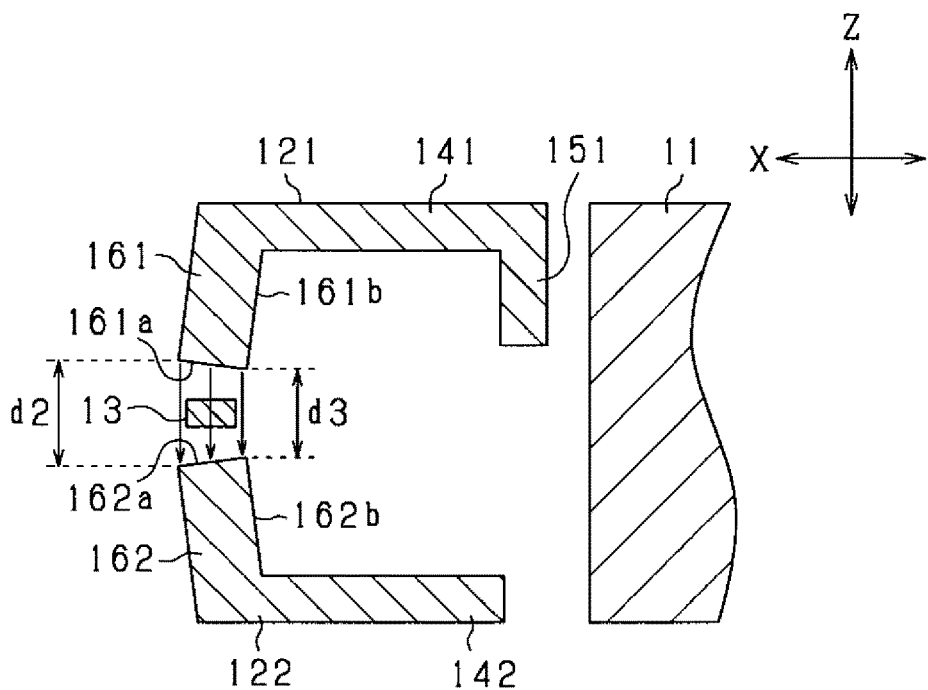
FIG. 7 shows a cross sectional view of a torque detecting device according to another embodiment.

For example, as shown in FIG. 7, the wall portions 161, 162 may be disposed obliquely with respect to the ring portions 141, 142.

The wall portions 161, 162 are formed obliquely to the axial direction so that the distal ends 161a, 162a thereof are positioned radially outside the base ends (connected portions to the ring portions 141, 142) of the wall portions 161, 162, respectively.

It should be noted that end faces orthogonal to the wall surfaces 161b, 162b of the wall portions 161, 162 are disposed on the distal ends 161a, 162a, respectively.

According to this, when the distance d3 between the distal ends 161a, 162a on the radially inner side is made shorter than the distance d2 on the radially outer side, the wall portions 161, 162 may be obliquely formed with respect to the ring portions 141, 142, and thus it is unnecessary to process the distal ends 161a, 162a of the wall portions 161, 162.

Further, the distal ends 161a, 162a of the wall portions 161, 162 are disposed so as to be positioned radially outer side with respect to the base ends of the wall portions 161, 162.

Therefore, as compared with a case where the wall portions 161, 162 are disposed along the direction orthogonal to the radial direction (i.e., the axial direction), for example, the magnetic force lines having rectilinearity tend to pass along the shape of the magnetic yoke 12 and it is possible to reduce the leakage of the magnetic flux.

That is, by providing the wall portions 161, 162 obliquely, it is possible to reduce the magnetic resistance as compared with a case where the wall portions 161, 162 are disposed along the direction orthogonal to the radial direction (i.e., the axial direction).

Figure 8:
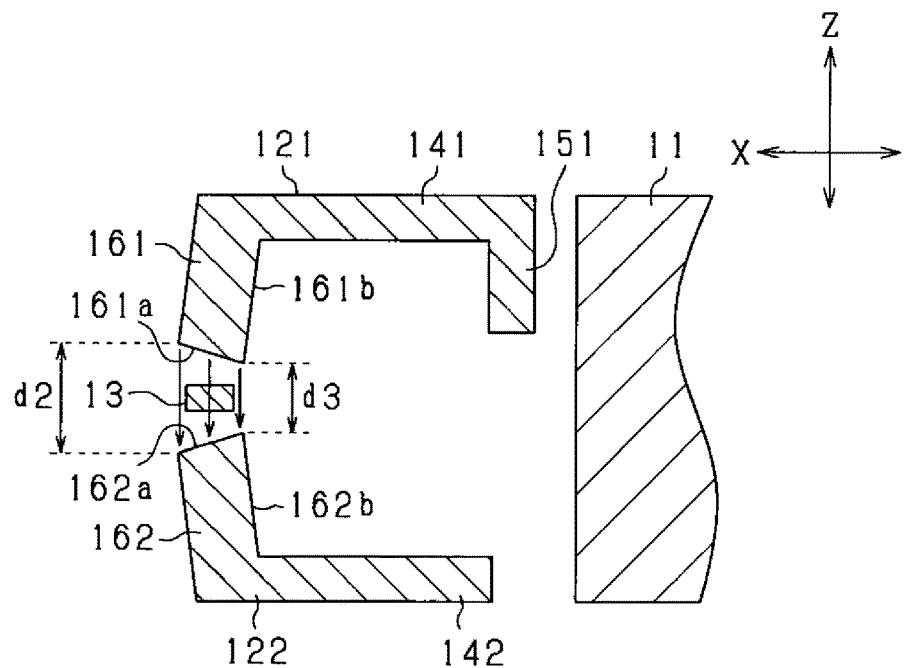
FIG. 8 shows a cross sectional view of a torque detecting device according to another embodiment.

It should be noted that, for example, as shown in FIG. 8, the wall portions 161, 162 are disposed obliquely with respect to the ring portions 141, 142, and end faces oblique to the wall surfaces 161b, 162b of the wall portions 161, 162 may further be disposed at the distal ends 161a, 162a thereof.

In this way, the distance d3 between the distal ends 161a, 162a on the inner side in the radial direction can further be shorter than the distance d2.

Further, only one of the wall portions may be obliquely disposed with respect to the ring portions 141, 142.

Although the wall portion 161 is formed on the outer edge of the first yoke 121, it may not be formed on the outer edge. Similarly, although the wall portion 162 is formed on the outer edge of the second yoke 122, it may not be formed on the outer edge.

The ring portions 141, 142 may be disposed so as to extend in an oblique direction with respect to the axial direction.

A magnetization direction of the magnet 11 may be changed. In this case, shapes of the claw portions 151, 152 may be arbitrarily changed according to the magnetization direction of the magnet 11.

Figure 9:
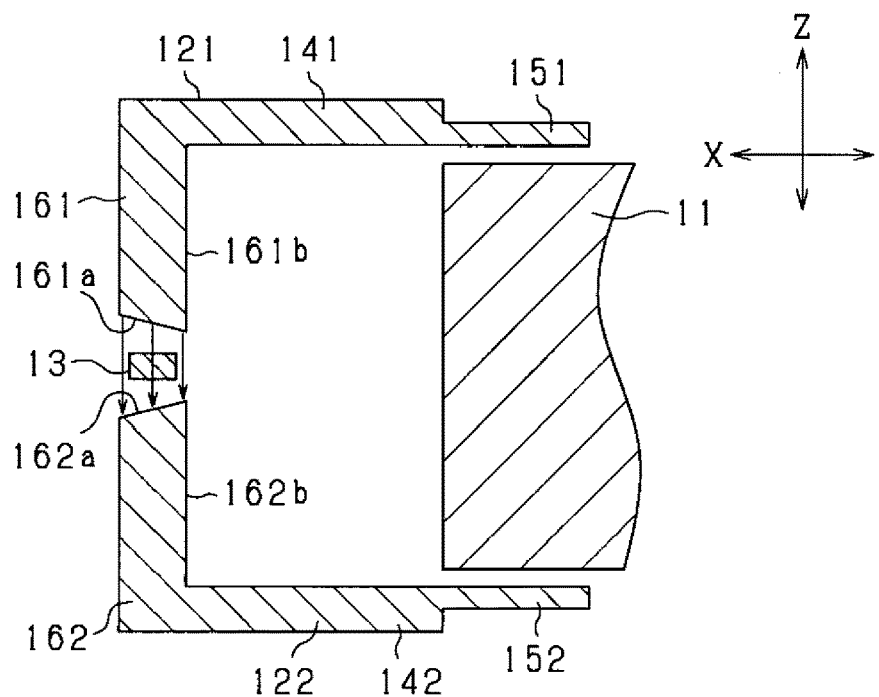
FIG. 9 shows a cross sectional view of a torque detecting device according to another embodiment.

For example, as shown in FIG. 9, when the magnet 11 is magnetized in the axial direction, the claw portions 151, 152 may be extended from the inner edges of the ring portions 141, 142 toward a shaft center.

In this case, the claw portions 151 of the first yoke 121 and the claw portions 152 of the second yoke 122 are disposed at the same position in the circumferential direction.

Although the wall portions 161, 162 are disposed on the entire circumferences of the ring portions 141, 142, they may not be disposed on the entire circumferences.

For example, wall portions 161, 162 may be disposed in an arc shape in plan view (not shown) so as to sandwich the magnetic sensor 13 therebetween in the axial direction.

What is claimed is:

1. A torque detecting device for detecting a torsional torque between a first shaft and a second shaft based on a torsional displacement of an elastic member that coaxially connects the first shaft and the second shaft, the torque detecting device comprising:
    a magnet fixed to the first shaft;
    a pair of magnetic yokes fixed in a state of being spaced apart from each other in an axial direction; and
    a magnetic sensor that detects a magnetic flux density between the pair of magnetic yokes; wherein
    the pair of magnetic yokes include opposing portions disposed opposed to the magnet and which displace in a circumferential direction with respect to the magnet when the elastic member is torsionally displaced, and wall portions disposed radially outside the opposing portions, the wall portions being disposed so as to extend from one magnetic yoke side to another magnetic yoke side and also disposed opposing each other with the magnetic sensor interposed therebetween; wherein
    distal ends of the wall portions of the pair of magnetic yokes are opposing each other and the magnetic sensor is disposed between the distal ends; and
    a distance between the distal ends on a radially inner side is shorter than a distance between the distal ends on the radially outer side.

2. The torque detecting device according to claim 1, wherein,
    each distal end of the wall portions of the pair of magnetic yokes has an end face, and an end face at one distal end is inclined with respect to an end face at another distal end.

3. The torque detecting device according to claim 2, wherein
    the end face of one of the distal ends of the wall portions of the pair of magnetic yokes is orthogonal to the axial direction.

4. The torque detecting device according to claim 1, wherein
    at least one of the wall portions disposed on the pair of magnetic yokes is formed obliquely to the axial direction so that the distal end thereof is positioned radially outside a base end of the wall portion.

5. The torque detecting device according to claim 1, wherein
    the magnetic yokes include ring portions formed in an annular shape surrounding an outer periphery of the magnet and are formed with the opposing portions and the wall portions; and
    each of the wall portions is disposed at an end portion on the radially outside the respective ring portions.

* * * * *